Dec. 12, 1961   R. B. WAGNER ET AL   3,012,838
EVENT RECORDER
Filed March 23, 1959   5 Sheets-Sheet 1

INVENTORS
Robert B. Wagner
James E. Hays, Jr

BY
Hart, Shields & Price
ATTORNEYS

INVENTORS
Robert B. Wagner
James E. Hays, Jr.

BY Harb, Shields & Price
ATTORNEYS

INVENTOR.
ROBERT B. WAGNER
JAMES E. HAYS
BY
ATTORNEY

United States Patent Office 3,012,838
Patented Dec. 12, 1961

3,012,838
EVENT RECORDER
Robert B. Wagner, Lanham, and James E. Hays, Oxon Hill, Md., assignors to ACF Industries, Incorporated, New York, N.Y., a corporation of New Jersey
Filed Mar. 23, 1959, Ser. No. 824,445
22 Claims. (Cl. 346—8)

This invention relates to recording devices and more particularly to recorders of the continuous recording type.

This application is a continuation in part of our application Serial No. 563,218, entitled Event Recorder, filed February 3, 1956, and now abandoned.

The many types of stationary equipment now in use for the instruction and training of personnel in the arts of piloting an aircraft, conning a ship, etc., require that some permanent record or plot be made of the students' activities while using the specific training equipment. In this way the student and instructor alike may examine such a record for the purposes of correcting errors, pointing out mistakes, etc., thereby increasing the overall ability of the student and at the same time utilizing the maximum capabilities of the training equipment. The need for a permanent record is especially acute in those training devices where the student is required to do a multitude of different operations during the course of a given problem. At the present time there are many record making or plot recording devices but none of which will indicate automatically the many different events which the student will be required to institute during the course of a problem. This can be best illustrated by means of an example. In the area of flight trainers, an entire bomber plane crew can be trained in an emplaced flight training device wherein the pilot and co-pilot maneuver the aircraft under all anticipated conditions and emergencies of a given flight, the gunners have simulated targets to shoot at, and the bombardier has a simulated target upon which to drop his bombs. A usual problem in this type of training apparatus would commence with the take-off and finish upon landing, and the instructor would normally set in innumerable problems and changes in conditions requiring instantaneous solution by the respective members of the crew. A record of any such simulated flight would need show the continuous course of the aircraft, points of enemy contact, when the guns were fired, when the bombs were dropped and other actions taken by the crewmen at any given time. As already mentioned, continuous recording devices are presently available for charting the course of the aircraft but these all require that the special events occurring during the problem be added to the plot manually which is unreliable, manpower consuming, and invariably leads to confusion. It is to correct this problem that this invention is directed.

The present invention is also useful in other fields than training, for example, engineering, agriculture, etc., where the coordination of various kinds of information is an important factor in enhancing operation, improved stability and facilitating the correlation of information concerning the happening of a plurality of events with respect to each other. Therefore, it is the broad object of the present invention to provide an event recorder capable of recording a large number of events.

It is an object of this invention to provide a recording device capable of automatically marking special events.

It is a further object of this invention to provide a continuous recording device or non-continuous recording device capable of automatically marking special events.

It is a further object of this invention to provide an event recorder which will automatically register special events by making any one of a plurality of clear, distinct and unique marks.

It is a further object of this invention to provide an event recorder which is simple in construction, instantaneous in operation, durable in use, facile to repair, and inexpensive to manufacture.

Further objects and purposes of this invention will be apparent after consideration of the following disclosure and drawings wherein.

Figures 1, 2, 3:
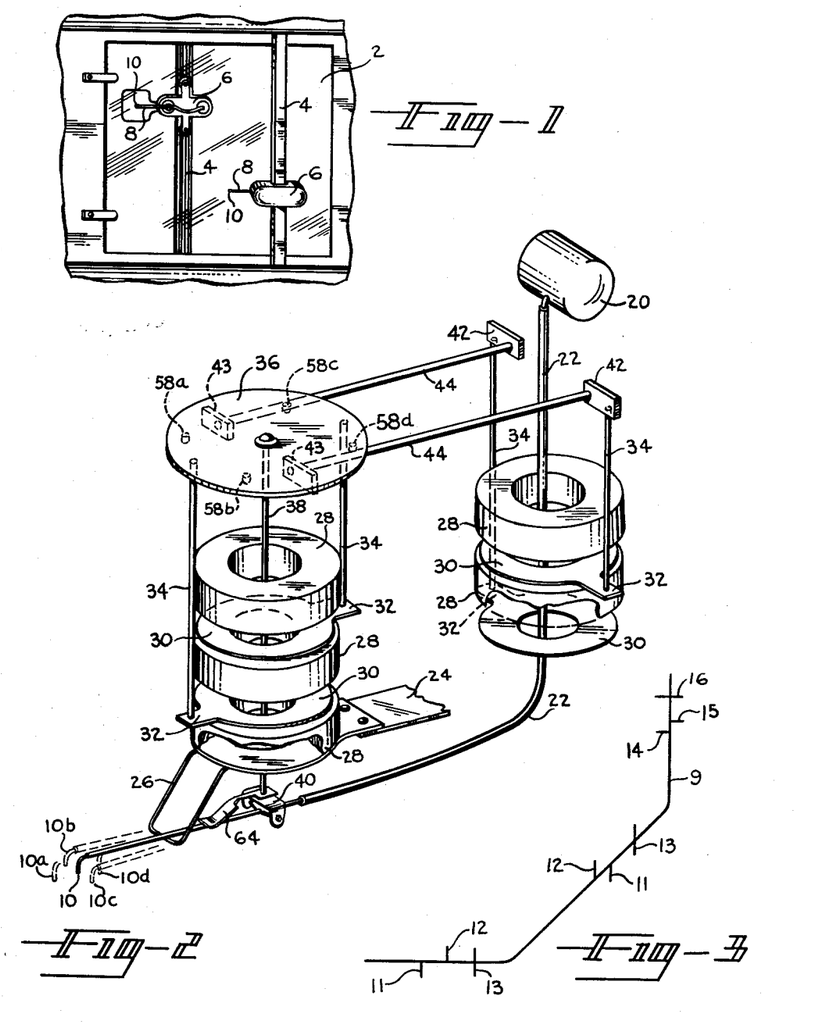
FIG. 1 is an elevational view of the recorder illustrating a transparent recording surface with an event recorder for each side of such surface.
FIG. 2 is a perspective view of the internal members of one embodiment of the event recorder.
FIG. 3 is a sample plot of the event recorder.
Figure 5:
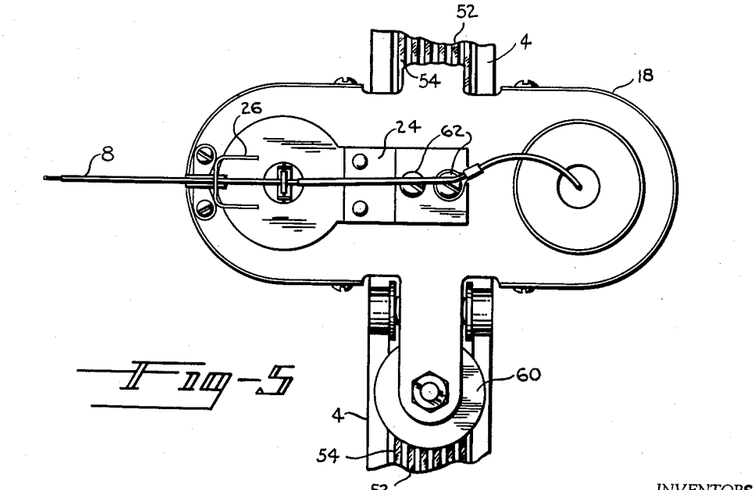
FIG. 5 is an underside view of the event recorder.

Referring now to FIG. 1, the application of the present invention is illustrated by two event recorders 6, one on either side of the recording platen 2. The recording platen 2 is preferably of a transparent material such as "Lucite" thereby allowing two simultaneous records to be made one on either side, for example, traces representing respectively the course of the training aircraft and the course of the enemy aircraft. Each of the event recorders 6 is mounted on a respective carriage 4 so that a stylus 8 projects out from one end of the event recorder 6 to come into contact with the surface of the platen 2 at the point indicated at 10. The event recorder 6 shown on the right hand side will record on the surface closest to the reader and therefore is a top view thereof, while the event recorder 6 on the left hand side will record on the surface away from the reader, and therefore is an underside view thereof. The event recorders 6 are moved vertically along the carriage 4 by any suitable means such as pulleys 60 (FIG. 5) and similarly the carriages 4 are moved horizontally across the surface by like means. It should be noted that any course of the aircraft can be resolved into horizontal ($x$) and vertical ($y$) components, which individual components are fed to the recording device such that horizontal ($x$) components effectively drive the carriage 4 across the surface of the platen 2, and the vertical ($y$) components effectively drive the event recorder 6 along the carriage. The stylus 8 then will correctly plot the resultant of these components which is the course of the aircraft. A sample continuous plot appears in the unbroken line designated at 9 in FIG. 3.

This invention not only utilizes the continuous plot techniques, but goes further by recording special events as is illustrated in FIG. 3, wherein various information is instantaneously recorded by individual marks. For example, the embodiment of the invention disclosed herein can make such marks as (*a*) a vertical half stroke below the line, indicated at 11, (*b*) a vertical half stroke above the line, indicated at 12, (*c*) a full vertical stroke indicated at 13, (*d*) a horizontal half stroke to the right of the line, indicated at 14, (*e*) a horizontal half stroke to the right of the line, indicated at 15, and (*f*) a horizontal full stroke indicated at 16, or (*g*) multiple marks. Each of these marks can be used to record special events like those listed above, viz. bomb drop, guns fired, flare drop, etc. It will also be apparent from the description hereinafter and FIG. 7 that additional marks at 45°, or some other selected angle to the vertical and horizontal, can be made by the event recorder of the present invention.

Referring now to FIG. 2 which is a schematic view of the internal parts of one embodiment of this invention, it can be seen that the event recorder 6, which is contained within a housing 18 (as appears in FIG. 4), consists of a reservoir 20 which feeds a continuous supply of ink through any suitable transfer means such as a rubber tube 22 to the stylus 8 where the ink then comes in contact with the recording surface of the platen 2. A flexible member such as the leaf spring 24 attached to the underside of the housing 18 has a stirrup 26 attached to the lower surface thereof for supporting the stylus 8 at some intermediate point on the stylus beyond the housing.

Within the housing 18 are enclosed, in the preferred embodiment five electro-magnetic devices such as stylus moving field coils 28 coaxially arranged in two groups, series or stacks wherein the coils are disposed in spaced relationship, the coils of the left hand stack serving to move the stylus 8 in a direction lengthwise thereof and the coils of the right hand stack in a transverse direction. Interposed between adjacent annular coils 28 are respective movable horizontal members such as annular plates or armatures 30. Each armature 30 has a projection or tonque 32 adapted to receive the lower ends of respective vertical members or rods 34. The upper free ends of the rods 34 associated with the left hand stack of coils 28 press against the lower surface of a horizontal member such as the movable disc 36 which is secured to the upper end of a second vertical member or shaft 38. The shaft 38 extends axially through the annular coils 28 and armatures 30 of the left hand stack to project beyond the housing where the lower end of the shaft 38 is affixed pivotally to the stylus 8 by any suitable means such as an inverted U-shaped clamp 40.

The second set or group of annular coils 28 and armatures 30, appearing on the right hand side of FIG. 2 are connected by suitable torque transferring means to the movable disc 36. Such torque transferring means includes rods 34 which are connected to the tongues 32 of the armatures 30 in a manner similar to that described above. The upper free ends of the rods 34 are affixed to respective torque arms 42 which are in turn attached to horizontal torque shafts 44 extending across the housing 18 for attachment to similar torque arms 43 beneath the movable disc 36.

The mechanical assembly described above is shown in FIG. 4 enclosed within the housing 18 wherein all components are numbered as before and several following additional features are also illustrated. To prevent overtravel of the stylus 8 damping devices such as four equally spaced dashpots 46 (only one of which is shown) are mounted above the movable disc 36 so that the end of the movable members of the dashpots 46 abut the top surface of movable disc 36. Each armature 30 has a projection such as a rivet 48 or the like, affixed to the underside thereof and at a point on the periphery of the armature 30 opposite the location of the tongue 32 so that the armature is spaced from the coil therebelow.

Figure 4:
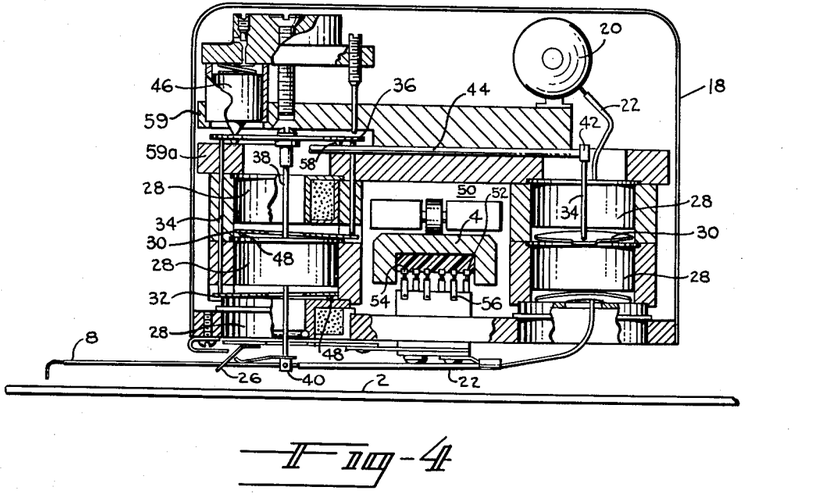
FIG. 4 is a sectional view of the event recorder in elevation.

The housing 18 has a recess therein indicated generally at 50 adapted to receive the carriage 4 which supports the corresponding event recorder 6. The carriage 4 is of U-shaped cross-section having an anelectric or insulating insert with a plurality of grooves 52 in the underside thereof. Electrically conducting members 54 are set into grooves 52 so that the events to be recorded are transmitted electrically from some external source through the conducting members 54 to the housing where they are picked up by contact members such as brushes 56, which are continuously in contact with the conducting members 54. The information is then carried to the respective electro-magnetic devices 28 by any suitable wiring, where it causes the event marks to be made, as hereinafter described.

The movable disc 36 is supported on its underside preferably on four pivot points 58a, 58b, 58c and 58d which may be projections from the lower part 59a of a frame 59 rigidly mounted with the housing 18, or, in the preferred embodiment, are projections on the disc 36, the pivot points being symmetrically arranged around the periphery of the movable disc as is best shown in FIG. 2.

Figures 6, 7:
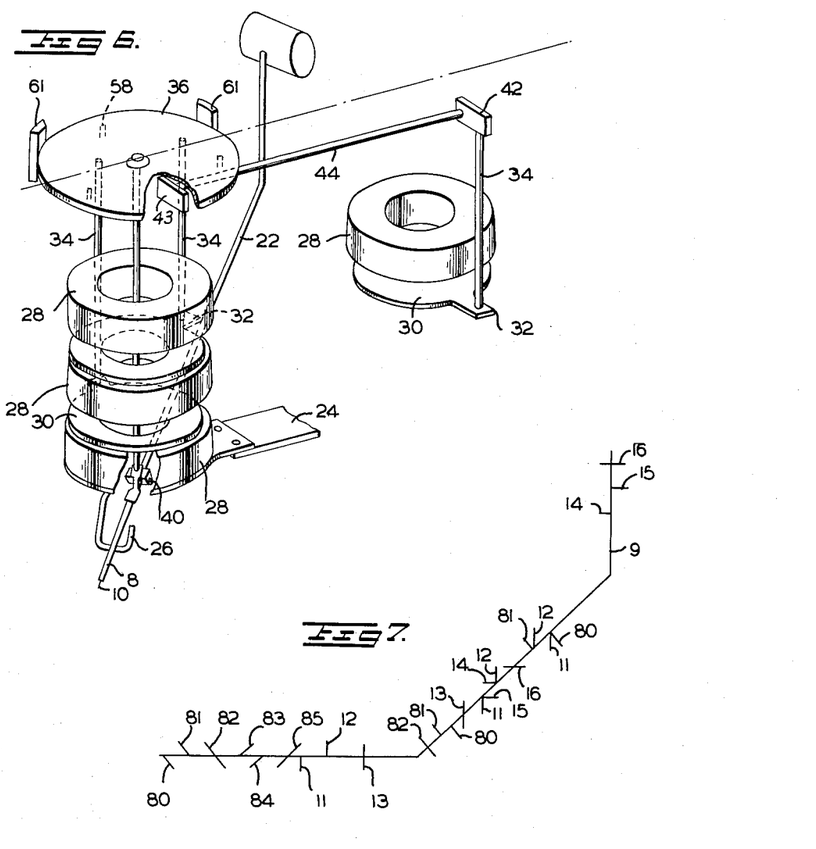
FIG. 6 is a perspective view of a second embodiment of the present invention.
FIG. 7 is another sample plot of the event recorder.

In the preferred embodiment the two groups of coils are arranged with their axis in a plane parallel with the longitudinal axis of the stylus 8, and the pivot points 58 are in a square array where the sides of the square are perpendicular and parallel to the longitudinal axis of the stylus 8. It is apparent that the two sets of electromagnets, except, preferably for the lower electromagnet carrying the stirrup 26, and the linkage associated therewith, may be rotated with respect to the axis shaft 38 and the stylus 8 so that the pivot point array would no longer have its sides parallel and perpendicular to the longitudinal axis of the stylus. In this manner the marks 11–16 shown in FIG. 3 could be rotated at any desired angle to the horizontal and vertical. The relationship between the torque shafts 44 and the pivot points would, in this modification, remain the same. It is also apparent that the preferred embodiment can be modified to utilize only three pivot points on the disc 36 thereby requiring only one electromagnet in the right hand group of FIG. 2. Such an arrangement, however, see FIG. 6, reduces the number of event marks that can be made with the stylus. In this embodiment the pivot point array would be triangular with the pivot points at the apex of the triangle, the two torque rods 34 of the left hand group connected at the mid points of two sides of the triangle and the torque shaft 44 from the right hand group connected at the mid point of the other side of the triangle. Thus, only one pivot point would be utilized when a particular mark is made. In the embodiment of FIG. 6 retaining elements 61, preferably three in number, equally spaced about the circumference of 36, are downward extensions of frame 59 and provide lateral support to prevent the disc 36 from jumping out of its axial position during operation.

It is also apparent from FIGS. 2 and 6 that all or any portion of the electromagnets 28 may be stacked around the shaft 38 thereby eliminating torque arms 42 and 43 and torque bars 44, if sufficient vertical space is available.

The pulley 60 mentioned above is attached to the lower side of the event recorder 6 (FIG. 5) and such pulley 60 has a counterpart on the upper side which does not appear so that the pulleys cause the event recorder to slide up or down the carriage 4. As described heretofore the stylus 8 is supported by the stirrup 26 which in turn is attached to the flexible member 24 fixed by any suitable fasteners 62 to the housing 18.

The normal operation of the event recorder 6 can be seen by considering FIG. 1 and FIG. 3. The trace 9 beginning in the lower left hand corner of the FIG. 3 is plotting the course of the aircraft as it flys due east, which trace is plotted by moving the carriage 4 from left to right, across the recording platen 2 while the recorder 6 remains at one fixed position on the carriage 4. As the aircraft takes up a northeast course, the carriage 4 continues traveling left to right across the platen 2 and the recorder 6 travels from bottom to top along the carriage 4, which simultaneous operations plot that portion of the trace 9 shown at an angle of 45° to the horizontal. As the aircraft takes up a due north course, the carriage 4 stops its transverse motion across the platen 2 and only the recorder 6 continues its upward motion along the carriage which plots the vertical portion of the trace 9.

The operation of this embodiment of the event recorder can best be seen by considering FIG. 2. The general operation involves energizing one of the annular coils 28 according to the input signal information received from the external source. This input signal, which is generated upon the happening of some event to be recorded is hereinafter referred to as an intermittent input signal. The energized coil will cause the adjacent armature 30 to be attracted to it thus raising such armature and the rod 34 affixed to the tongue 32 of such armature. As the rod 34 moves vertically it will push up on the movable disc 36 which will pivot on the pivot points 58 furthermost removed from the rod 34. As the movable disc 36 is raised the shaft 38 is caused to move since it is rigidly affixed to such movable disc, and as the shaft 38 moves, so too does the stylus 8 since it is affixed to such shaft. It should be noted that as the rod 34 pushes upon the movable disc 36, such movable disc has a normal tendency to slide away from the pushing force which would normally mean that no effect, except possible bending would be felt on the shaft 38. The pivot points 58 then are set into slight recesses in the frame 59a made to accept such pivot points thereby assuring that the movable disc will correctly pivot and not slide, and further that the shaft 38 will move in the proper direction rather than merely bend.

In order to make the marks shown in FIG. 3 it is necessary to have four annular coils, four armatures and consequently four rods, all of which will make four separate marks, if energized independently. It can readily be seen that the full strokes, vertical and horizontal are the two half strokes made consecutively. In order to make four marks, then, the stylus 8 must move from its normal position 10 (shown solid in the lower left hand corner of FIG. 2) in four directions (illustrated by the dotted stylii 10a, 10b, 10c and 10d) which requires that the movable disc 36 move in four directions.

Considering the elements shown on the left hand side of FIG. 2 this is accomplished by the top annular coil 28 attracting the armature 30 below it causing the rod 34 to push against the movable disc 36 which turns on pivot points 58a and 58b causing the shaft 38 and stylus 8 to move to position 10d, making the horizontal half stroke 15 to the right of the line. By energizing the next lower annular coil 28, the armature 30 beneath it is picked up causing the rod 34 to push up on the movable disc 36 which turns on pivot points 58c and 58d causing the shaft 38 and stylus 8 to move to position 10a making the horizontal half stroke 14 to the left of the line.

The remaining marks are made by energizing the annular coils shown on the right hand side of FIG. 2, that is by energizing the topmost annular coil 28, the armature 30 immediately beneath it is lifted, causing the rod 34 (shown in full) to rotate the torque arm 42, the horizontal torque shaft 44 and the torque arm 43 beneath the movable disc 36 in a counterclockwise fashion (as shown by the arrow), which causes the movable disc to turn on pivot points 58a and 58c, causing the shaft 38 and the stylus 8 to move to position 10c making the vertical half stroke 13 below the line. By energizing the next lower annular coil 28 on the right, the armature 30 beneath it is lifted, causing the rod 34 (partly obscured) to rotate the torque arm 42, the horizontal torque shaft 44 and the torque arm 43 beneath the movable disc 36 in a clockwise fashion (as shown by the arrow), which causes the movable disc to turn on pivot points 58b and 58d, causing the shaft 38 and the stylus 8 to move to position 10b making the vertical half stroke 12 above the line.

To make full strokes the respective coils are energized in consecutive order thereby in effect making two half strokes simultaneously which will record as a full stroke. Needless to say, energizing the respective coils, i.e., e.g., coils for making marks 12 and 13, concurrently or simultaneously, will produce no mark whatsoever since the forces on the stylus will be equal and opposite. However, it is readily apparent that if the coils for making marks 12 and 14 are energized simultaneously the pen will make a mark at about 45° as explained in more detail hereinafter. The various marks which can be made with individual and simultaneous energization of the coils is more clearly shown in FIG. 7. Thus, mark 80 is made by the simultaneous energization of the two coils utilized to make marks 11 and 15, while the mark 81 utilizes the coils for making marks 12 and 14. The sequential making of marks 81 and 80 will result in mark 82. The simultaneous energization of the coils for making marks 12 and 15 will result in mark 83 while energization of the coils for making marks 11 and 14 will result in mark 84. The utilization of both marks 83 and 84 will give mark 85.

Some of the various combinations of marks are shown on the angular portion of the trace of FIG. 7. More complicated marks using several combinations may be utilized if the trace speed is sufficiently low.

To insure that the armatures 30 will be attracted to their respective annular coils 28, a projection such as a rivet 48 is inserted in one side of the armature removed from the tongue 32 and the rod 34 attached thereto. In this manner the armatures 30 cannot lie flat on the annular coil next adjacent to it and instead the rivet 48 insures that an air gap will exist beneath such armature, causing the flux lines to pass through the armature which causes it to be attracted when the respective annular coils are energized.

It should be noted that the damping devices such as dashpots 46 already mentioned are mounted above and contiguous with the movable disc 36 for the purpose of preventing backlash of such movable disc after it has effected a half stroke. The dashpots 46 are preferably in the same quantity as the total number of directions the movable disc 36 can negotiate and further, such dashpots should be located midway between adjacent pivot points 58, opposite the rods 34 and disposed on the outer periphery of the movable disc. The dashpots 46 serve a second purpose in that they provide the restoring force necessary to return the armatures 30 to their quiescent position when the annular coils 28 are de-energized. Thus, when any annular coil 28 is energized the armature 30 adjacent thereto, is attracted to the coil, lifting the armature, the rod 34, the movable disc 36 which pushes against and compresses the dashpot 46 above such rod. When the annular coil 28 is deenergized, the only force operating on the elements is that of the compressed dashpot 46 which pushes against the movable disc 36, and the rod 34 which causes the armature to be removed from the annular coil.

Another unique feature of this invention resides in its ability to make a non-continuous trace or an intermittent trace. This type of plotting or course recording is necessary where it is desired to synchronize two or more traces with one another for the purpose of comparison, etc. Generally speaking this is done by lifting all stylii from their respective recording surfaces at the same instant thus leaving short gaps in the trace itself. This is accomplished in the embodiment described here by including in the housing 18 an additional annular coil 28 located at the bottom of the housing 18 in close proximity to the flexible member 24 to which the stylus 8 is attached. This additional annular coil 28 (the lowermost of the group on the left hand side of FIG. 2 and FIG. 4) is energized as before, causing the flexible member 24 to be attracted thereto, which lifts the stirrup 26 and hence the stylus 8. FIG. 2 and FIG. 4 show the stylus 8 in its up or lift position, off the platen 2. To insure the stylus 8 returning to the surface, a resilient or biasing member such as a spring 64 is attached to the shaft 38 and abuts on the stylus 8.

Figure 8:
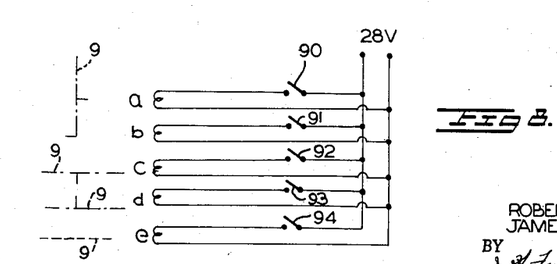
FIG. 8 is one example of an electrical circuit utilized in conjunction with the present invention.

FIG. 8 shows the simplest electrical circuit for the operation of the embodiment of FIG. 2. In this case a common voltage source is connected to each electromagnet a–e through manually operable switches 90 through 94 respectively. The left portion of FIG. 8 shows the mark which is made by the pen upon the closing of the respective switch. Thus, the closing of switches 90 and 91 applies input signal which will result in no mark, while the closing of switches 90 and 92 simultaneously will result in a 45° line below the line and to the right. The closing and opening of switches 90 and 93 simultaneously will result in the pen making a 45° mark above the trace line and to the right. Other marks which are readily made include marks at 45° to the trace above and below the trace and to the left and the various combinations of these marks as shown in FIG. 7.

Figure 9A:
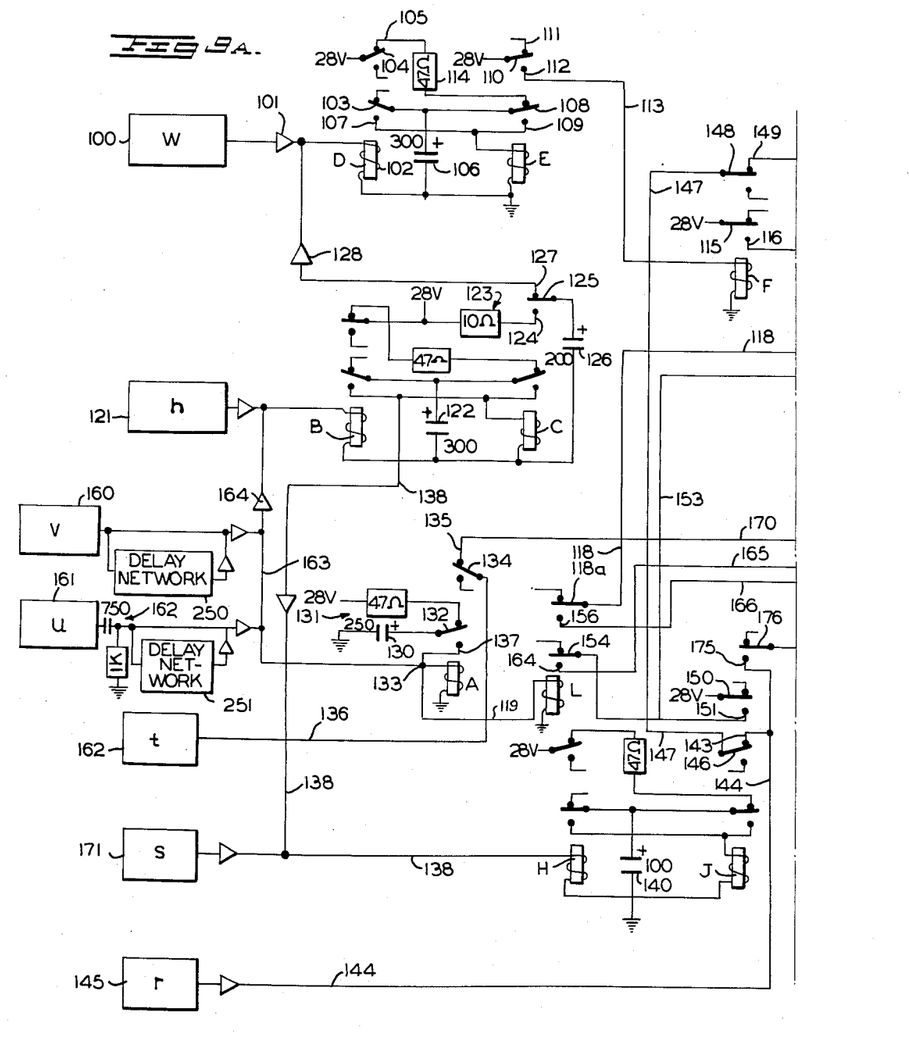
FIGS. 9a and b are an example of an electrical circuit utilized to obtain a variety of event markings automatically.
Figure 9B:
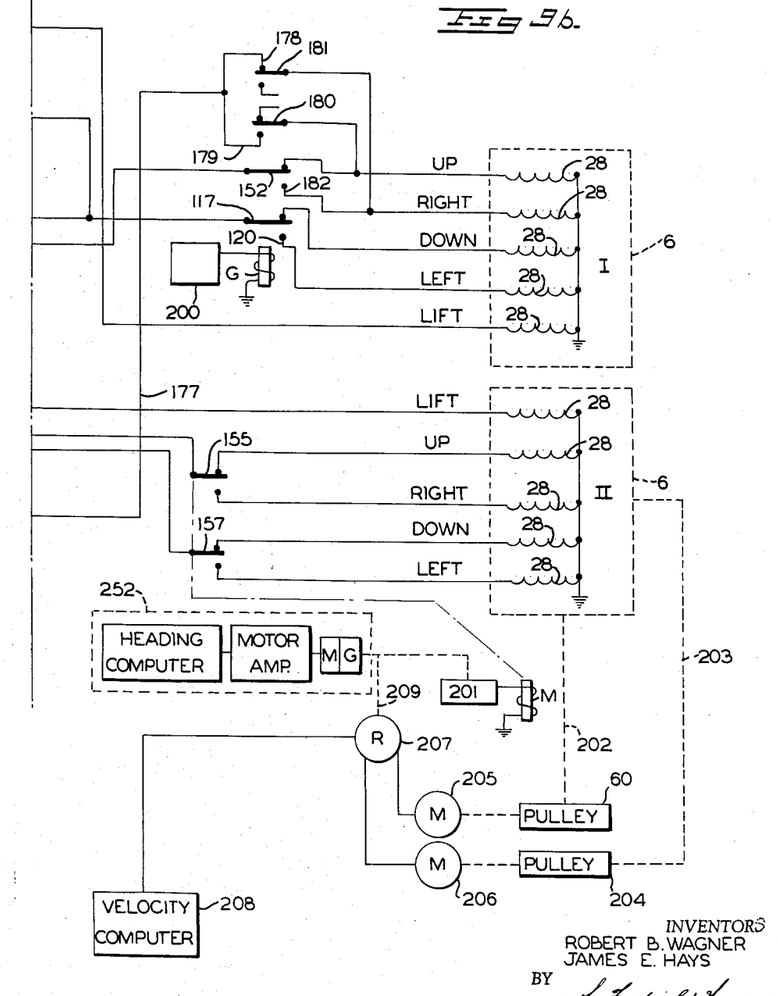

Attention is now invited to FIGS. 9a and 9b where an example of a circuit is shown for automatically energizing the various electromagnets individually, consecutively and simultaneously to make a plurality of individual and composite marks on a trace. This example is directed to the two-pen plotting arrangement shown in FIG. 1 but as is apparent to those skilled in the art may be utilized for single pen plotting. The two pens are shown schematically as the five electromagnets 28 in groups I and II.

Specifically, an intermittent input signal or pulse either instantaneous or continuing, which pulse is generated in generator 100 upon the happening of some event, passes through diode 101, through the winding 102 of relay D to ground. The relay D operates arms 103 and 104 in response to such a pulse. The arm 104 disconnects 28 v. source from contact 105 while arm 103 connects charged capacitor 106 through arm 103 to contact 107 and the winding of relay E to ground. This pulse moves arm 108 into contact with 109, and arm 110, connected to a 28 v. source, from contact 111 to contact 112. Thus, voltage is applied through line 113 to the winding of relay F. When the voltage passing through D has terminated, arm 104 returns to its normal position and connects a 28 v. source through a time delay resistor 114 through arm 108 to recharge capacitor 106. In this manner, the arm 110 is used to generate a voltage pulse in line 113 of specific duration independent of the length of the original pulse on relay D and determined solely by the resistance of relay E and the charge on capacitor 106. The energizing of relay F connects a voltage source through arm 115 and contact 116 to contact 117 which in the normal position shown is connected to the electromagnet which causes the pen to make a vertical mark below the trace line. Line 118 also carries this voltage pulse to arm 118a of relay L which in its normal position as shown is not connected to any operating circuit. However, when relay L is energized through line 119 by one of the other pulse sources *v* or *u*, the connection of arm 115 and contact 116 will result in a mark being made by both pens I and II which mark will be below the line. This exemplifies the recording of an event which is important on both the traces made by pens I and II.

Relay G when energized causes the arm connected to line 117 to be connected to contact 120 which would then make a mark to the left of the pen trace. The relay G is energized automatically by control 200 when the trace direction is between ±45° and 135° to 225° to the vertical (north). In this manner, the possibility of a mark being made which is superimposed on, and therefore indistinguishable from the trace, is eliminated.

The second event *h* generates an intermittent input signal or voltage pulses in 121 which energizes relay B which has contacts similar to relay D described above wherein a capacitor 122 is discharged through the winding of relay C, interrupts the charging voltage of capacitor 122, and connects it through a resistance 123 to contact 124 and arm 125. The capacitor 122 operates relay C and applies a voltage pulse to line 138. Relay arm 125 of relay C is moved down to charge a second capacitor 126. After a predetermined charging time, i.e., the discharging time for capacitor 122, the arm 125 is released and moves against contact 127 to discharge the capacitor 126 through contact 127, diode 128 to the winding of relay D. While the capacitor 126 is charging relay H has been energized through line 138 and the capacitor 140 associated therewith energizes relay J. For the event such as *h*, relay J operates prior to relay F, the latter relay being energized through diode 128, relays D and E and line 113 from capacitor 126.

Relay J moves arm 146 away from operating contact 143 thereby disconnecting line 144 connected to voltage source 145 which is energized upon the happening of an event *r*. Contact 150 connected to a 28 v. source is moved to contact 151 thereby energizing lead 153 which is connected to arm 154 of relay L and to arm 152 of relay G. Arm 152 is normally connected through the upper contact to the "up" coil of pen I.

The events *v* and *u* generate input signals or voltage pulses in generators 160 and 161 respectively. Generator 160 is a pulse generator while 161 applies a constant voltage to the differentiating network so that the leading edge of the constant voltage is converted into a pulse. The pulse from generator 160 is applied to conductor 163 and to delay network 250 which provides a second pulse to lead 163 which is delayed in time from the first pulse. In like manner the delay network 251 provides a second pulse to lead 163 from source 161. Thus, a pulse applied to lead 163 from either generator 160 or 161 will operate the same relays and therefore the effect of events *v* and *u* will be described at the same time.

A voltage pulse in lead 163 passes through diode 164 and energizes relays B, C, D, E and F in the same manner as a pulse from the generator 121 for event *h*. Lead 163 is also connected to common terminal 133 and a voltage pulse at this point not only energizes relay A but also relay L. The energizing of relay A moves arm 132 down onto contact 137. The capacitor 130 which was being charged through network 131 from a voltage source is then connected to common terminal 133 so as to retain relays A and L energized until the capacitor discharges. Thus, relays A and L are energized twice, first by the initial voltage pulse from generators 160 or 161 and then at a finite time later, as determined by the time characteristics of the delay networks 250 and 251, a second voltage pulse is applied.

Relay L, when energized, moves arm 154 down onto contact 164 which is connected by lead 165 to arm 155 of relay M and normally energizes the "up" electromagnet of pen II by connecting the 28 v. source on contact 150 of relay J through lead 153 to arm 154, contact 164, lead 165 to arm 155. It should be noted that relays H and J have been energized in the maner described above through lead 138 from the relay B and C circuit.

The upper arm 118a of relay L is moved down into contact with 156 which is connected through lead 166 to arm 157 on relay M. Arm 157 is normally connected to the down electromagnet of pen II. The delays of the circuits shown are such that the "up" mark is made first on pen II then the down mark. Further, since the delay networks 250 and 251 cause a second pulse, the mark made on pen II by events *u* and *v* will be a double up and down mark across the trace. Relay M is operable by control 201 explained in detail hereinafter which monitors the trace direction and energizes relay M (similarly for G) when the trace direction is between ±45° and 135° to 225° from the north position on the plotting board.

The down portion of the multiple mark just described is made through arm 118a which is connected through lead 118 to contact 116 of relay F. As stated before, relay F operates at a finite time later than relays L and J.

The generation by 162 of a pulse responsive to an event *t* applies a voltage pulse on lead 136 which is connected to arm 134 of relay A. If relay A is inactive the arm 134 is connected to contact 135 which is connected through lead 170 to the "lift" electromagnet of pen II. The energization of relay A by events *v* or *u* disconnects arm 134 from contact 135 so that if the pen is in a lift position it is returned to the plot to make the appropriate mark. In this manner the happening of the more important events *u* and *v* is always recorded.

The occurrence of an event *s* energizes generator 171 to apply an intermittent input signal or voltage pulse through lead 138 to operate relays H and J. Thus, event *s* results in an "up" mark on pen I by connecting arm 150 to contact 151 thereby applying a voltage to lead 153 and arm 152 of relay G to make the "up" mark. Since relay L is not energized no other mark is made.

The occurrence of an event $r$ energizes generator 145 to apply an intermittent input signal or voltage pulse to lead 144 and normally to contacts 143 and 175. Contact 143 is normally connected to arm 146, lead 147, arm 148 of relay F through contact 149 to the "lift" electromagnet of pen I. Thus, event $r$ results in a dashed line on pen I unless relay J is energized. Relay J is energized by events $h$, $v$, $u$ and $s$. Thus, the occurrence of an event $r$ at the same time as an event $h$, $v$, $u$ and $s$ could not normally be recorded. However, the situation is alleviated by providing contact 175 connected to lead 144. When relay J is operated to disconnect the "lift" circuit on pen I, which would ordinarily record the event $r$ by a dashed line, the arm 176 is connected to contact 175 and any voltage pulse in lead 144 resulting from the occurrence of an event $r$ is connected through lead 177 to contacts 178 and 179 of relay G. Contact 179 is normally disconnected from its operating arm 180 while contact 178 is normally connected to arm 181 for the position of relay G shown, i.e., when the trace is between 45° to 135° and 225° to 315° from the north (y) axis of the plotting board. The arm 181 is connected to the "right" electromagnet of pen I. In this manner the simultaneous occurrence of an event $r$ with $h$, $u$, $v$ or $s$ will result in both the up and right electromagnets of pen I being energized thereby giving a 45° mark on the trace. If relay G is energized then the event $h$, $v$ $u$ or $s$ pulse passes from arm 152 to contact 182 to make a "right" mark while the arm 180 is now connected to contact 179 so that the event $r$ applies a voltage to the up electromagnet resulting in a 45° mark up and right. It is also apparent from the examples of operation given above that other interconnection similar to those shown can be made by those skilled in the art to provide for marks at 45° to the left and up, to the left and down, to the right and down, or combinations of these as well as multiple marks utilizing these basic marks. It is also apparent that while angles of 45° have been specifically called for in this description, the utilization of the modification of FIG. 6 would allow the use of any desired angle. Further, one angle could be used on one plotting board and a second angle used on the other so that the events could easily be associated with the proper trace.

Table I is a compilation of the events, relays energized by the events, and the various marks made in the preferred embodiment.

206. The motors 205 and 206 are energized through a resolver 207 which is responsive to a continuous input signal from a velocity computer 208 to energize the motors 205 and 206. The heading shaft 209 which is positioned by heading-computer 252 operates a cam switch in control 201 to energize relay M when the heading is within the prescribed limits set forth above. Similar apparatus and connections may be utilized to control pen I. Other means well known in the art may also be utilized to energize relay M and/or relay G.

While preferred embodiments of this invention are shown and described, it should be understood that various changes in the shape, size and arrangement of parts may be made without departing from the spirit of the invention or the scope of the following claims, wherein:

What is claimed is:

1. A recorder comprising a recording head with a stylus movable with respect to said recording head, a platen supporting a trace receiving surface, a first input signal source, means including a heading shaft, a heading resolver attached thereto, electromechanical means responsive to said first input signal whereby the input signal is resolved into rectangular coordinate voltages for activating the said electro-mechanical means for moving said recording head with respect to said platen so that said stylus makes a trace whose direction and configuration is a function of said first input signal, said recording head containing a plurality of electromagnets each of said electromagnets being connected through a linkage means to said stylus, a plurality of intermittent signal sources, means connecting at least one of said intermittent signal sources to each of said electromagnets for displacing said stylus in at least one of a plurality of directions in response to the activation of at least one of said electromagnets by said intermittent signal, said direction being angularly disposed to said trace, and means responsive to the direction of said trace including a cam switch mounted on the said heading shaft for automatically selectively changing the electromagnet to be energized.

2. The recorder of claim 1 wherein said linkage means includes a multi-pivot plate supporting said stylus.

3. The recorder of claim 1 wherein said linkage means includes a multi-pivot plate supporting said stylus, and a plurality of linkage bars movable in response to the energization of at least one of said electromagnets to pivot said plate and deflect said stylus.

4. The recorder of claim 1 wherein said linkage means

*Table I*

| Event | Relays Energized | Disconnections | Marks Made | | | |
|---|---|---|---|---|---|---|
| | | | Relays G and M in position shown | | Relays G and M energized | |
| | | | Pen I | Pen II | Pen I | Pen II |
| $w$ | D, E and F | lift, Pen I | down | none | left | none. |
| $h$ | B, C, D, E, F, H, J | lift, Pen I | up-down | none | right-left | none. |
| $u$ or $v$ | B, C, D, E, F, A, L (twice) H, J. | lift, Pen I<br>lift, Pen II | up-down | up-down<br>up-down | right-left | right-left.<br>right-left. |
| $t$ | none | none | none | lift | none | lift. |
| $s$ | H, J | lift, Pen I | up | none | right | none. |
| $r$ | none | none | lift | none | lift | none. |

The event recorder 6 represented in dotted outline in FIG. 9b is driven through a mechanical connection 202, including pulleys 60 (see FIG. 5), to move the recorder 6 in a north-south (vertical) direction along the carriage 4. The carriage 4 is moved in an east-west (horizontal) direction through a mechanical connection 203, including pulleys 204. The pulleys 60 and 204 are driven, respectively, by north-south motor 205 and east-west motor includes a multi-pivot plate supporting said stylus, an armature supported adjacent to each of said electromagnets and movable in response to the energization of its respective electromagnet, and at least one linkage bar connected to each of said armatures and operatively supported to move said plate about at least one of said pivots in response to the energization of its respective magnet.

5. The recorder of claim 1 wherein said linkage means includes a multi-pivot plate supporting said stylus, and a plurality of linkage bars movable in response to the energization of at least one of said electromagnets to pivot said plate and deflect said stylus, the number of said electromagnets and said pivot points being equal.

6. The recorder of claim 1 wherein said plurality of electromagnets are supported in two groups, each of said groups containing at least one electromagnet, said two groups having parallel axes and forming a plane perpendicular to said platen.

7. The recorder of claim 1 wherein said linkage means includes a multi-pivot plate supporting said stylus, said pivot points being symmetrically located about one surface of said plate, and a plurality of linkage bars contiguous with said plate at points intermediate to said pivot points.

8. The recorder of claim 1 including switching means responsive to one of said intermittent signals to disconnect at least one of said electromagnets and connect a second electromagnet to activate said linkage means to move said stylus in a predetermined direction to record the simultaneous occurrence of said one signal with another of said intermittent signals.

9. The recorder of claim 1 including means responsive to at least one of said intermittent input signals to successively selectively activate at least one of said electromagnets to deflect said stylus successively in the same direction.

10. The recorder of claim 1 including means including a switch responsive to one of said intermittent input signals for preventing the energization of at least one of said electromagnets by another of said intermittent input signals.

11. A recorder comprising a recording head with a stylus for making a recording trace, a platen supporting a trace receiving surface, means responsive to variations in a continuous input signal for moving the head with respect to the platen so that the stylus makes a trace whose configuration is a function of the input signal, and means responsive to an intermittent input signal for momentarily displacing the stylus in directions angularly disposed with respect to the instantaneous direction of the trace made by the stylus in response to the continuous input signal, the stylus displacing means including two groups of electromagnets each of which electromagnets is connected to be energized from correlated intermittent input signals, said electromagnets of each group being coaxially stacked above the stylus, and a linkage interposed respectively between each group of the electromagnets and the stylus whereby one group of electromagnets deflects the stylus in opposite directions normally disposed to the first directions when the magnetic flux of the electromagnets is changed by variation in the respective intermittent input signals.

12. A recorder according to claim 11 wherein the electromagnets are each in the form of an annulus.

13. A recorder according to claim 12 wherein the linkage includes a disc disposed above one group of electromagnets, an elongated member extending from the center of said disc through said electromagnets to connect with the stylus, and rods connecting the respective electromagnets with the periphery of said disc, the points of connection of the rods to the disc being spaced about the periphery whereby the energizing of any of the electromagnets tilts the disc in a corresponding direction to deflect the stylus.

14. A recorder according to claim 13, wherein the second group of electromagnets have rods connected therewith, rotating members attached to said rods, transverse members attached to said rotating members, and additional rotating members attached to said transverse members adjacent said disc and mounted around the periphery of said disc whereby the energizing of any of said second group of electromagnets tilts the disc in a corresponding direction to deflect the stylus.

15. In a recording device of the type comprising a recording platen, a stylus, a carriage for said stylus, and means for moving said carriage in accordance with information supplied from some external source, an event recorder on said carriage comprising a housing, a plurality of electromagnetic devices in said housing, electrical connections between said electromagnetic devices and said external source of information, a plurality of first horizontal members mounted adjacent said electromagnetic devices to be attracted thereby, a plurality of first vertical members each attached at one end to one of said first horizontal members, a second horizontal member contiguous with the free end of said first vertical members, a second vertical member attached to said second horizontal member and extending outside said housing and attached to said stylus.

16. In a recording device of the type comprising a recording platen, a stylus for marking said platen, a carriage for said stylus, means for moving said carriage across said surface, means for moving said stylus along said carriage in accordance with information supplied from some external source, an event recorder comprising grooves in said carriage, conducting members in said grooves electrically connected with said external source, a housing mounted on said carriage and over said conducting members, contact members mounted within said housing and adjacent said conducting members, a plurality of electromagnetic devices mounted in said housing and electrically connected with said contact members, a plurality of first horizontal members mounted adjacent said electromagnetic devices to be attracted thereby, a plurality of first vertical members each attached at one end to one of said first horizontal members, a second horizontal member contiguous with the free end of said first vertical members, a second vertical member attached to said second horizontal member and extending outside said housing and attached to said stylus.

17. An event recorder supplied with information from some external source comprising a housing, a recess in said housing, a carriage member within said recess to support said housing, electrical connecting means on said carriage to bring said information from the external source to said housing, contact members within said housing adjacent said electrical connecting means, a plurality of first annular coils connected to said contact members and axially disposed to one another, a plurality of first annular plate members separating said first annular coils, projections on said first annular plate members, a plurality of rods perpendicularly affixed at one end to said projections, a movable plate member contiguous with the free end of said rods, a shaft member attached to said movable plate member and projecting without said housing along the axis of said annular coils and annular plates, a stylus attached to the free end of said shaft member, a plurality of second annular coils electrically connected with said contact members and axially disposed to one another within said housing, a plurality of second annular plate members adjacent said second annular coils, and torque transfer members connected to said second annular plate members and said movable plate member.

18. A device according to claim 17 in which said first and second annular plate members have a support attached thereto juxtaposed with said projections.

19. A device according to claim 17 having a reservoir within said housing, and means connecting said reservoir with said stylus.

20. A device according to claim 17 having a plurality of pivot supports peripherally arranged beneath said movable plate.

21. A device according to claim 17 having a flexible member attached to the underside of said housing and disposed therefrom supporting said stylus, and a biasing member attached to said shaft and abutting said stylus.

22. A device according to claim 17 having a plurality of damping devices peripherally disposed and abutting said movable plate.

References Cited in the file of this patent

UNITED STATES PATENTS

| | | |
|---|---|---|
| 1,322,148 | Sprague | Nov. 18, 1919 |
| 1,933,792 | Dalton | Nov. 7, 1933 |
| 2,669,500 | Och et al. | Feb. 16, 1954 |
| 2,684,280 | Opocensky et al. | July 20, 1954 |

FOREIGN PATENTS

| | | |
|---|---|---|
| 526,516 | Germany | June 6, 1931 |